June 3, 1930.  K. R. FROEDTERT  1,761,883
WATER VEHICLE
Filed Aug. 29, 1928   2 Sheets-Sheet 2

WITNESSES

INVENTOR
Kurtis R. Froedtert,
By R. S. Caldwell
ATTORNEY

Patented June 3, 1930

1,761,883

UNITED STATES PATENT OFFICE

KURTIS R. FROEDTERT, OF MILWAUKEE, WISCONSIN, ASSIGNOR TO BRINSMERE BOAT AND CYCLE COMPANY, OF MILWAUKEE, WISCONSIN, A CORPORATION OF WISCONSIN

WATER VEHICLE

Application filed August 29, 1928. Serial No. 302,823.

This invention has for its object to provide a water vehicle in the nature of a floating velocipede impelled manually or by means of pedals and capable of being folded or collapsed to occupy small space for transportation.

Another object of the invention is to provide for adjustability of the propeller and rudder for adapting the water vehicle to different conditions.

Another object of the invention is to accomplish the above purposes with a structure which will be strong and durable and efficient though inexpensive to manufacture.

With the above and other objects in view, the invention consists in the water vehicle as herein claimed and all equivalents.

In the accompanying drawings in which like characters of reference indicate the same parts in different views, Fig. 1 is a side elevation of a water vehicle constructed in accordance with this invention, the near pontoon having been removed, alternative positions for the propeller shaft and rudder being indicated in dotted lines;

Fig. 4 is a detail view of one of the supporting brackets;

Fig. 5 is a longitudinally sectional view thereof with the swinging arms in intermediate positions;

Fig. 6 is a sectional view of the gear case.

Figure 1:
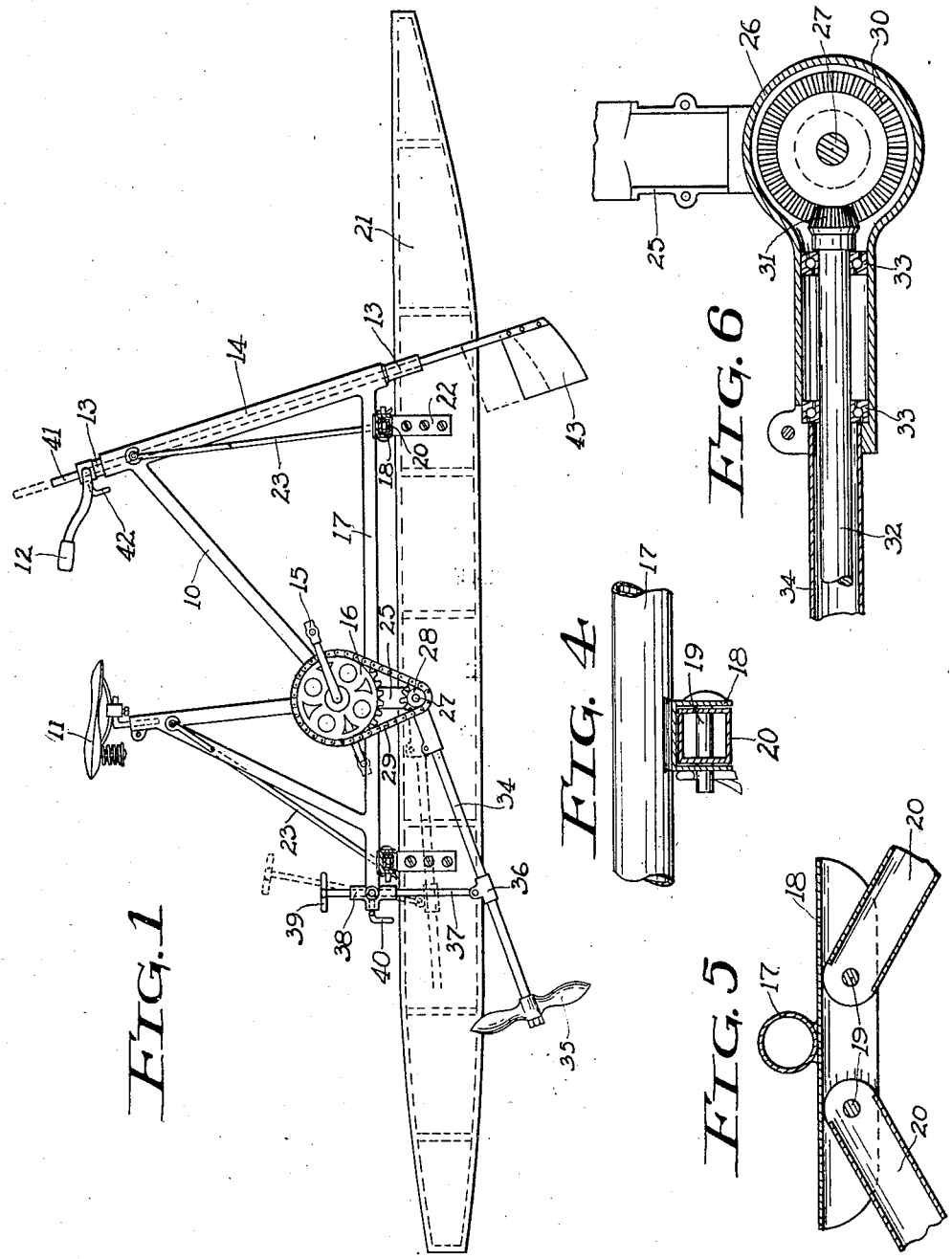

In these drawings, 10 indicates a tubular frame somewhat similar in construction to a bicycle frame having the usual saddle 11, handle bars 12 on a tubular steering post 13 fitting a steering head 14 and having pedal cranks 15 with a sprocket wheel 16. On the bottom horizontal frame member 17 which connects the lower end of the steering head with the pedal bracket and seat post brace are a pair of supporting brackets 18 preferably brazed or welded on the bottom of said member, one being positioned near the steering head 14 and the other near the rear end of said member 17. Each of these supporting brackets 18 is of channel shape, as seen in Fig. 4, and has pivotally mounted between its parallel flange members on pivot pins 19 a pair of swinging arms 20 preferably of square tubular construction. When extended these arms 20 fit within the brackets 18 and bear against the upper walls thereof to form a rigid supporting joint for supporting the weight of the vehicle frame and rider on a pair of pontoons 21 mounted on the outer ends of the arms.

Figure 2:
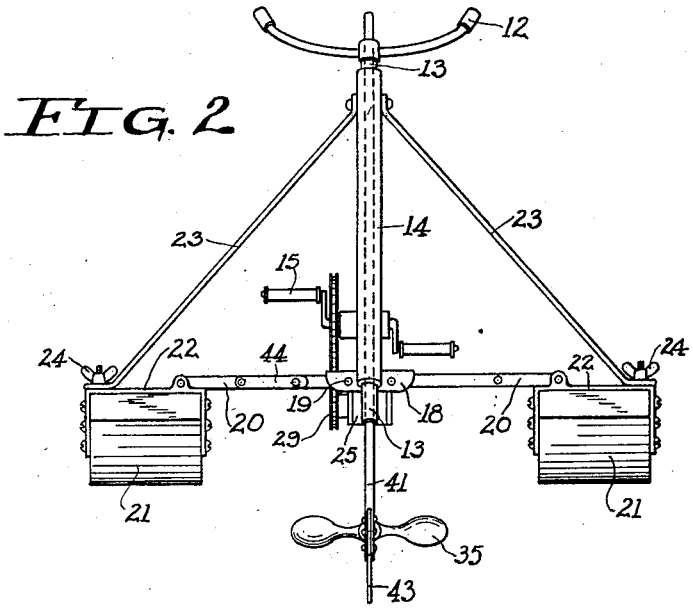
Fig. 2 is a front elevation thereof.

The pontoons are preferably elongated floats of hollow sheet metal or light wooden construction or of other material, which may be braced as indicated in dotted lines in Fig. 1, and, as shown in Fig. 2, they have brackets 22 extending across them and down their sides where they are rigidly secured by screws, said brackets being pivotally connected at the top of the pontoons near their inner edges with the ends of the swinging arms 20. Brace rods 23 are pivotally connected at their upper ends to the upper end of the steering head 14 and the upper end of the seat frame and their lower ends are detachably clamped by means of wing nuts 24 to the top of the pontoons near their outer edges, said wing nuts being threaded on studs projecting from the brackets 22.

When so connected the swinging arms 20 and the brace rods 23 with the brackets 22 form rigid lateral extensions of the frame construction with the pontoons 21 firmly and securely mounted at a distance from the center line to give great stability to the vehicle with its operator.

A yoked hanger bracket 25 is securely mounted on the frame member 17 beneath the crank shaft bearing and pivotally carries at its forked lower end a gear case 26 having a shaft 27 extending therethrough with a sprocket 28 on the outside driven by a chain 29 from the sprocket wheel 16 and with a bevel gear 30 on the inside meshing with a pinion 31 on a drive shaft 32 in suitable ball-bearings 33 of the gear case. A shaft tube 34 clamped to the gear case 26 surrounds the shaft 32 and extends rearwardly terminating in a bearing for said shaft where a propeller 35 is secured thereto, said shaft tube 34 at about the middle of its length being provided with a coupling 36 having a connecting rod 37 pivotally connected thereto. The connecting rod 37 slides through a swinging bearing 38 pivotally mounted on the rear end of the frame 10, a handle 39 being provided on the end thereof for raising or lowering the propeller shaft and a clamping screw 40 being provided in the bearing for clamping the connecting rod in its adjustment. Thus the propeller shaft may be raised or lowered to bring the propeller between the pontoons or depressed to a greater or less extent, as shown, and it may be clamped in its adjustments.

Within the tubular steering post 13 to which the handle bars 12 are connected is a rudder stem 41 which is longitudinally slidable, but clamped in its adjustments and prevented from independent turning movement by a clamping screw 42 threaded through the end of the steering post 13 and entering a keyway in said rudder stem 41. At the lower end of the rudder stem is a rudder blade 43 for steering the vehicle by the turning of the handle bars.

Figure 3:
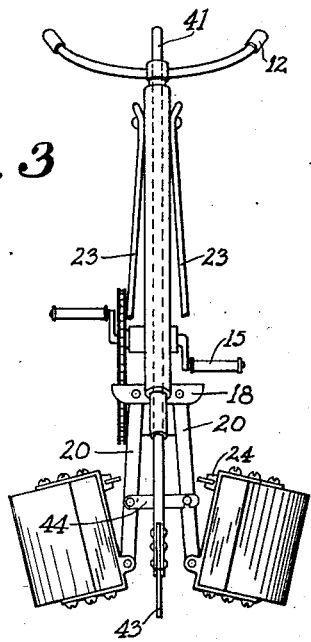
Fig. 3 is a similar view of the device in its collapsed or folded condition.

When extended ready for use, the structure is strong and well braced and with wide spread pontoons giving it the necessary stability. It is also capable of adjustment to suit the depth and character of the various bodies of water on which it may be used by raising or lowering the propeller and rudder. But when it is desired to fold or collapse it for storage or transportation purposes, as in carrying the vehicle on the running board of an automobile from one lake to another, it is only necessary to disconnect the brace rods 23 from the pontoons and to allow them to hang on their loose pivotal connections with the frame, such connections being so loose to permit the rods to lie close to the frame, as shown in Fig. 3, and then swing the arms 20 downwardly in the brackets 18 turning the pontoons upwardly thereon, and locking the pairs of arms 20 together by means of a locking hook 44 pivotally mounted on one of the arms of said pair and engaging a headed stud on the other. The vehicle is thus folded into a small compass for the mentioned purpose, from which it may be readily and quickly set up for use whenever desired.

What I claim as new and desire to secure by Letters Patent is:

1. A water vehicle comprising a frame, swinging arms mounted on the frame, pontoons pivotally mounted on the swinging arms, brace rods detachably connecting the frame with the pontoons, and steering and propelling means mounted on the frame, said detachable brace rods and swinging arms permitting the pontoons to fold with respect to the frame.

2. A water vehicle comprising a frame, flanged brackets thereon, swinging arms pivotally mounted on the brackets and having an extended position lateral to the frame and a folded position to approximately the plane of the frame, pontoons mounted on the swinging arms, brace rods detachably connecting the pontoons with the frame when the arms are in their extended position, and propelling and steering means on the frame.

3. A water vehicle comprising a frame, channel-shaped transverse supporting brackets on the frame with their flanges extending downwardly, swinging arms pivotally mounted to said supporting brackets between the flanges thereof and having extended positions lateral to the frame in which they are braced by said brackets and the flanges thereof and having folded positions close to the plane of the frame, pontoons carried by the swinging arms, brace rods connecting the pontoons to the frame in the extended position of the swinging arms, and propelling and steering means on the frame.

4. A water vehicle comprising a frame, channel-shaped supporting brackets thereon with their flanges extending downwardly, square tubular swinging arms pivotally mounted on the supporting brackets between the flanges and having extended positions lateral to the frame in which they are braced by the supporting brackets and their flanges and having folded positions approximating the plane of the frame, pontoons mounted on the swinging arms, brace rods detachably connecting the pontoons to the frame in the extended position of the swinging arms, locking means for locking the swinging arms together in their folded position, and propelling and steering means on the frame.

5. A water vehicle comprising a frame, swinging arms mounted thereon having an extended position lateral to the frame and a folded position approximating the plane of the frame, pontoons pivotally mounted on the swinging arms, and brace rods pivotally mounted on the frame and detachably connected with the pontoons for bracing them in their extended position.

6. A water vehicle comprising a frame in the nature of a bicycle frame, having a saddle and a steering post with handle bars, a rudder having a stem slidably adjustable within the steering post, a pedal shaft having a sprocket, a gear case pivotally mounted on the frame, a shaft in the gear case, a pinion on the shaft, a chain connecting the pinion with the sprocket, a drive shaft journalled in the gear case and having driving gear connection with the shaft, a tube surrounding the drive shaft, a connecting rod pivotally mounted on the tube, a swinging bearing on the frame through which the connecting rod passes, means for clamping the connecting rod, a propeller on the drive shaft, swinging arms on the frame, pontoons carried thereby and foldable with respect to the frame, and brace rods connecting the frame with the pontoons in their extended position.

7. A collapsible water vehicle of the bicycle frame type comprising an upright frame having saddle and handle bar, swinging arms mounted on the frame, pontoons carried by the swinging arms, brace rods detachably connecting the pontoons with the upper part of the frame, steering means connected with the handle bar, and propelling means mounted on the frame, said detachable brace rods and swinging arms permitting the pontoons to fold with respect to the frame.

8. A collapsible water vehicle of the bicycle frame type comprising a frame having saddle and handle bar and pedal sprocket, swinging arms mounted on the frame, pontoons carried by the swinging arms, brace rods detachably connecting the frame with the pontoons, steering means connected with the handle bar, and a propeller driven by the crank sprocket, said detachable brace rods and swinging arms permitting the pontoons to fold with respect to the frame.

In testimony whereof I affix my signature.

KURTIS R. FROEDTERT.